United States Patent [19]

Koyanagi et al.

[11]  4,173,696

[45]  Nov. 6, 1979

[54] METHOD FOR THE POLYMERIZATION OF VINYL MONOMERS

[75] Inventors: Shunichi Koyanagi, Ibaragi; Niichiro Hasegawa, Joetsu; Toshihide Shimizu, Joetsu; Sensaku Katusima, Joetsu; Ichiro Kaneko, Joetsu, all of Japan

[73] Assignee: Shin-Etsu Chemical Co., Ltd., Japan

[21] Appl. No.: 871,249

[22] Filed: Jan. 23, 1978

[30] Foreign Application Priority Data

Jan. 25, 1977 [JP] Japan ................................... 52-7100
Nov. 11, 1977 [JP] Japan ............................... 52-135356
Nov. 24, 1977 [JP] Japan ............................... 52-140989

[51] Int. Cl.$^2$ ........................... C08F 2/02; C08F 2/18; C08F 2/22
[52] U.S. Cl. ......................................... 526/62; 526/74
[58] Field of Search ......................................... 526/62

[56]  References Cited

U.S. PATENT DOCUMENTS 4,068,059  1/1978  Witenhafer et al. ................... 526/62

FOREIGN PATENT DOCUMENTS 2105579  4/1972  France ...................................... 526/62

Primary Examiner—Alan Holler
Attorney, Agent, or Firm—McGlew and Tuttle

[57] ABSTRACT

A novel and improved method for polymerizing a vinyl monomer in a polymerization reactor is provided. The inner walls of the polymerization reactor and other surfaces coming into contact with the monomer are coated with an aqueous liquid containing at least one alkali metal or ammonium salt of an anionic dye of the sulfonic carboxylic acid form and having a pH value adjusted not to exceed 7 by aid of a pH adjusting agent, and the thus coated surfaces are dried with heat before the polymerization is conducted. The method serves to greatly reduce the deposition of polymer scale on those surfaces and, consequently, improve the productivity as well as the quality of polymer product.

23 Claims, No Drawings

METHOD FOR THE POLYMERIZATION OF VINYL MONOMERS

The present invention relates to a novel and improved method for the polymerization of a vinyl monomer or a mixture of vinyl monomers in the presence of a polymerization initiator in a polymerization reactor, according to which the undesirable polymer scale deposition on the inner walls of the polymerization reactor and the surfaces of a stirrer and other equipment associated with the reactor and coming into contact with the monomer or monomers can be remarkably reduced.

Various methods are known for the polymerization of vinyl monomer or monomers, e.g. suspension polymerization, emulsion polymerization, solution polymerization and bulk polymerization. None of these methods can be free from the problem of polymer scale deposition on the inner walls of the polymerization reactor and the surfaces of any equipment associated with the reactor that come into contact with the monomer or monomers.

Polymer scale deposited on the various surfaces within the polymerization reactor results in reducing the yield of polymer and the cooling capacity of the polymerization reactor. Further, the polymer scale deposited on the surfaces tends to come off and enter into polymer product, eventually resulting in lowering the quality of the polymer product. Furthermore, the removal of such scale from the surface each time one polymerization run is over requires a great deal of labor and time, resulting in the reduction of productivity. Besides, the scale-removing operation causes serious health problems to workers. This is due to inhalation by the workers of the volatile monomers, among others, vinyl chloride.

A number of methods have been proposed for the prevention of polymer scale deposition on the inner walls of a polymerization reactor and the surfaces of a stirrer and the like. According to one method, for example, the surfaces are coated, prior to polymerization, with organic dyes and other polar organic compounds, such as amine compounds, quinone compounds, aldehyde compounds, and the like as disclosed in U.S. Pat. No. 3,669,946. This method can be considerably effective in preventing polymer scale deposition. However, the use of the polar organic compounds as a solution in an organic solvent gives rise to toxicity and safety problems. On the other hand, when water is used as the solvent in place of the organic solvent results in reducing polymer scale-preventing effects to an impractical extent.

The above method of coating the surfaces with a polar organic compound for the polymerization of vinyl chloride, styrene, or a mixture composed mainly of any of the monomers is disadvantaged by the fact that the polymer scale-preventing effect is less in emulsion polymerization or polymerization involving an emulsifying agent in the polymerization mixture than in suspension polymerization in an aqueous medium.

Further, the polymerization of vinyl chloride usually a polymerization reactor which is made of stainless steel, while the emulsion polymerization of styrene or the copolymerization of styrene and butadiene or acrylonitrile, styrene and butadiene or the like mixture does not employ a stainless steel reactor, but a glass-lined reactor. Glass-lined polymerization reactors are more suitable for polymer scale prevention but disadvantaged by poor heat transfer coefficient and shorter serviceable life, as well as difficulty in manufacturing large ones due to poor workability in glass lining.

The method disclosed in the above-mentioned U.S. patent is indeed effective for polymer scale prevention in the suspension polymerization of vinyl chloride, but not so in the polymerization of the other monomer or monomers.

In order to overcome the above-described problems, improved methods are disclosed in Belgian Pat. Nos. 837,056, 844,215 and 845,168, according to which the inner walls of the polymerization reactor and other surfaces coming into contact with the monomer or monomers are coated with a polar organic compound, e.g. an organic dye, or a specific combination of two polar organic compounds optionally mixed with a metal salt, followed, if necessary, by treating the coated surfaces with an oxidizing agent or a reducing agent.

The coating liquid used in the Belgian patents is, in most cases, a liquid in an organic solvent, such as methyl alcohol, ethyl alcohol, toluene, methylene chloride, dimethylformamide and the like and, as a consequence, disadvantages can not be avoided due to the use of the organic solvents even if polymer scale prevention is satisfactorily effective. When water is used as the solvent in place of the organic solvents, the effect of polymer scale prevention is very much reduced as demonstrated in the examples given in the Belgian patents.

As is understood by the above description, polymer scale deposition can be reduced to a large extent by coating the inner walls of the polymerization reactor with an organic solution of the polar organic compounds, such as organic dyes. However, no satisfactory method is known in which the inner walls of the polymerization reactor is coated with an aqueous coating liquid to give an effective polymer scale prevention equally as in the case of the organic coating liquids. This is presumably due to difficulty in the formation of water-insoluble coating layers to exhibit the effect of polymer scale prevention on the inner walls of the polymerization reactor when the coating liquid is an aqueous dispersion or an aqueous solution.

It is therefore an object of the present invention to provide a novel and improved method for the polymerization of vinyl monomers in which the polymer scale deposition on the surfaces such as the inner walls of the polymerization reactor is effectively prevented by coating the surfaces with an aqueous coating liquid instead of the coating liquids in an organic solvent as used in the prior art methods.

Another object of the present invention is to provide a method for the polymerization of vinyl monomers in which polymerization is carried out in a polymerization reactor having surfaces in contact with the monomers, the surfaces being coated with an aqueous coating liquid, followed by drying, to form water-insolubilized coating layer thereon resulting in effectively preventing polymer scale deposition thereon.

Still another object of the present invention is to provide a method for the preparation of polymer products, such as polyvinyl chloride resin, having superior qualities.

A further object of the present invention is to provide a method for the polymerization of vinyl monomers in which polymer scale deposition on the surfaces in contact with the monomers can be effectively prevented irrespective of the types of polymerization, including suspension polymerization, emulsion polymerization, bulk polymerization and the like, homopolymerization, copolymerization, and any kinds of polymerization initiators and additives to the polymerization mixture used.

These and other objects of the invention in the polymerization of a vinyl monomer or a mixture of vinyl monomers, the polymerization being conducted in a polymerization reactor having a surface in contact with the monomer or mixture of monomers, can be satisfactorily attained by coating the surface, prior to the polymerization, with an aqueous coating liquid containing at least one selected from the group consisting of alkali metal salts and ammonium salts of water-soluble anionic dyes of the sulfonic acid form or carboxylic acid form and having a pH value adjusted by use of a pH adjusting agent not to exceed 7, and drying the thus coated surface.

In accordance with the method of the present invention, the amount of polymer scale deposition on the various surfaces, such as the inner walls of the polymerization reactor and the stirrer shaft and blades, can be surprisingly reduced. The method is free from being influenced by the types of polymerization, e.g. suspension polymerization, emulsion polymerization, bulk polymerization and the like, the kinds of vinyl monomers to be polymerized, and the composition of the polymerization mixture.

Further, the effectiveness of the method is exhibited irrespective of the construction of the polymerization reactor i.e. stainless steel or glass-lined. This makes the advantage that stainless steel polymerization reactors can be used for the polymerization of vinyl monomers in accordance with the method of the present invention, if the fact that the use of the stainless steel reactors has been unpractical in the prior art due to excessively large amounts of polymer scale deposition is taken into account. Furthermore, the method of the present invention is quite free of the problems that are inherent in the use of organic solvents, for example, a health problem to the workers due to the toxicity of the solvents and the fire hazards that are possible due to the inflammability of the organic solvents.

The mechanism of polymer scale prevention in accordance with the method of the present invention is presumably that the film formed from the coating liquid applied on a surface is very strongly adhered to the surface since the film-forming substances originally present in the coating liquid are insoluble or hardly soluble in water and the thus formed film can effectively prevent the adsorption, through not well understood, of all kinds of dissociated and undissociated species in the polymerization mixture to the surface in any types of polymerization.

The anionic dyes of the sulfonic acid form or carboxylic acid forms useful in the method of the present invention in the form of an alkali metal or ammonium salt are exemplified by the following.

(1) Dyes of the sulfonic acid form:

C.I. Acid Yellow 38, C.I. Food Yellow 3, C.I. Reactive Yellow 3, C.I. Direct Orange 2, C.I. Direct Orange 10, C.I. Acid Red 18, C.I. Acid Red 52, C.I. Acid Red 73, C.I. Direct Red 186, C.I. Direct Red 92, C.I. Direct Violet 1, C.I. Direct Violet 22, C.I. Acid Violet 11, C.I. Acid Violet 78, C.I. Mordant Violet 5, C.I. Direct Blue 6, C.I. Direct Blue 71, C.I. Direct Blue 106, C.I. Reactive Blue 2, C.I. Reactive Blue 4, C.I. Reactive Blue 18, C.I. Acid Blue 116, C.I. Acid Blue 158, C.I. Acid Black 1, C.I. Acid Black 2, C.I. Direct Black 38, C.I. Solubilized Vat Black 1, C.I. Fluorescent Brightening Agent 30, C.I. Fluorescent Brightening Agent 32, C.I. Acid Blue 1, C.I. Acid Blue 40, C.I. Acid Blue 59, C.I. Acid Blue 113, C.I. Acid Orange 7, C.I. Direct Blue 1, C.I. Direct Blue 86, C.I. Direct Orange 26, C.I. Direct Red 31, C.I. Direct Black 19, C.I. Direct Black 32, C.I. Direct Black 77, C.I. Direct Green 1, C.I. Acid Orange 3, C.I. Acid Black 124, C.I. Acid Red 52, C.I. Acid Red 80.

(2) Dyes of the carboxylic acid form and dyes of both the sulfonic acid and carboxylic acid forms:

C.I. Direct Yellow 1, C.I. Direct Red 1, C.I. Mordant Black 5, C.I. Azoic Brown 2, C.I. Direct Brown 1, C.I. Direct Brown 101, C.I. Direct Green 26, C.I. Acid Red 87, Mordant Yellow 26, C.I. Direct Brown 37, and C.I. Direct Orange 97.

The above-named anionic dyes are hereinafter called Compound (a) for the sake of convenience.

The aqueous solution of Compound (a) at a relatively low concentration of about 0.1 to 1% by weight has a pH value of about 10. Such an aqueous alkaline solution of Compound (a) can exhibit no satisfactory effect for polymer scale prevention when applied on the surface of the inner walls of the reactor and dried to form a coating film on the surface. It is essential in the present invention to adjust the pH of the aqueous solution of Compound (a) to a value of about 7 or below, preferably, about 5 or below by use of a pH adjusting agent.

The pH adjusting agents to be used for the adjustment of the pH value of the aqueous dispersion or solution of Compound (a) are exemplified by various organic and inorganic acids, such as sulfuric acid, hydrochloric acid, phosphoric acid, nitric acid, carbonic acid, perchloric acid, molybdic acid, tungstic acid, formic acid, acetic acid, oxalic acid, lactic acid, maleic acid, glycolic acid, thioglycolic acid, phytic acid and acidic salts of these acids, if available. Among the above named compounds, most preferred are sulfuric acid, phosphoric acid, nitric acid, molybdic acid, lactic acid, glycolic acid, thioglycolic acid, phytic acid and acidic salts thereof, if available, from the standpoint of obtaining better results of polymer scale prevention. These pH adjusting agents are used conveniently in the form of aqueous solution.

The aqueous coating liquid to be applied on the inner walls of the reactor is prepared by first dissolving or dispersing Compound (a) in water, and then adding to the resulting solution or dispersion one of the above-named pH adjusting agents to bring the pH value of the aqueous liquid to about 7 or below. The concentration of Compound (a) in the coating liquid is preferably in the range from about 0.01 to about 5% by weight, taking into account the solubility in water of Compound (a), workability in coating operation with the coating liquid, and lowering of the solubility in water of Compound (a) when the pH value is lowered to 7 or below.

The thus prepared aqueous coating liquid with the pH value of 7 or below is applied on the inner walls of the reactor and other surfaces and dried to form a coating film exhibiting scale prevention. It is recommended that the workability with the aqueous coating liquid or the spreading of the coating liquid on the surface may further be improved by adding a small amount, say, from about 1 to 20% by weight, of a monovalent alcohol having from 3 to 5 carbon atoms in a molecule. The monovalent alcohol suitable for the purpose are exemplified by n-propyl alcohol, iso-propyl alcohol, n-butyl alcohol, isobutyl alcohol, sec-butyl alcohol, tert-butyl alcohol, n-amyl alcohol, tert-amyl alcohol, iso-amylalcohol, sec-amyl alcohol and the like, among which iso-butyl alcohol is referred because of less unpleasant odor.

The addition of the monovalent alcohol to the coating liquid is effective not only in the improvement of workability in the coating operation but also in the further enhancement of the polymer scale prevention.

Methyl alcohol or ethyl alcohol as the monovalent alcohol is not recommended for the above purpose since a larger amount is required to obtain the desired expected results. Monovalent alcohols having more than 5 carbon atoms in a molecule are not suitable because of their lower solubility in water.

The effectiveness of the method of the present invention is, alternatively, improved by adding to the coating liquid a water-soluble cationic dye having, in a molecule, at least one pair of conjugated double bonds and at least one nitrogen atom (hereinafter called Compound (b)) or a water-soluble silicic acid, a silicate compound, or a water-soluble salt of a metal other than alkali metal (hereinafter called Compound (c)) in combination with Compound (a).

The addition of the above Compound (b) to the coating liquid is effective in reducing coating amounts and in decreasing drying temperatures in order to produce a sufficiently durable coating film for the purpose of satisfactorily preventing polymer scale formation. On the other hand, the addition of Compound (c) to the coating liquid is effective for improving the durability of the coating films on the surface.

The water-soluble cationic dyes suitable as Compound (b) include water-soluble azine dyes, such as C.I. Basic Red 2, C.I. Basic Blue 16, and C.I. Basic Black 2; water-soluble acridine dyes, such as C.I. Basic Orange 14 and C.I. Basic Orange 15; water-soluble triphenylmethane dyes, such as C.I. Basic Blue 1, C.I. Basic Violet 3, C.I. Basic Blue 26, C.I. Basic Violet 14, C.I. Basic Blue 5, and C.I. Basic Blue 7; water-soluble thiazine dyes, such as C.I. Basic Blue 9, C.I. Basic Yellow 1, C.I. Basic Blue 24, C.I. Basic Blue 25, and C.I. Basic Green 5; water-soluble methine dyes, such as C.I. Basic Red 12 and C.I. Basic Yellow 11; water-soluble diphenylmethane dyes, such as C.I. Basic Yellow 2; water-soluble xanthene dyes, such as C.I. Basic Violet 10 and C.I. Basic Red 1; water-soluble azo dyes, such as C.I. Basic Orange 2 and C.I. Basic Brown 1; and water-soluble oxazine dyes, such as C.I. Basic Blue 12 and C.I. Basic Blue 6.

The compounds suitable as Compound (c) in the present invention are exemplified by water-soluble silicic acids or silicates, such as orthosilicic acid, metasilicic acid, meso-disilicic acid, meso-trisilicic acid, meso-tetrasilicic acid, sodium metasilicate, sodium orthosilicate, sodium disilicate, sodium tetrasilicate, potassium metasilicate, potassium hydrogen dislicate, lithium orthosilicate, hexalithium orthodisilicate, water glass, 12-silicotungstic acid, iso-12-silicotungstic acid, 10-silicotungstic acid, potassium 12-silicotungstate, potassium iso-12-silicotungstate, potassium 10-silicotungstate, sodium 12-silicotungstate, silicomolybdic acid, potassium silicomolybdate, and sodium silicomolybdate; and water-soluble salts, such as salts of oxyacids, acetic acid, nitric acid, hydroxides and halides of metals belonging to alkaline earth metals, e.g. magnesium, calcium, and barium; zinc group metals, e.g. zinc; aluminum group metals, e.g. aluminum; tin group metals, e.g. titanium and tin; iron group metals, e.g. iron and nickel; chromium group metals, e.g. chromium and molybdenum; manganese group metals, e.g. manganese; copper group metals, e.g. copper and silver; and platinum group metals, e.g. platinum.

When Compound (b) or (c) is employed in combination with Compound (a), the ratio by weight of Compound (b) or (c) to Compound (a) is preferably in the range from 100:0.1 to 100:1,000 or, preferably, from 100:3 to 100:100 in order to obtain a strong adhesion between the coating film and the surface of the inner walls of the polymerization reactor. The total concentration of Compounds (b) and/or (c) and Compound (a) in the aqueous coating liquid is prefered to be in the same range, i.e. from 0.01 to 5% by weight, as in the coating liquid with Compound (a) alone.

In any case, the pH value of the aqueous coating liquid should be about 7 or below in the present invention. This is because that the coating films obtained with an alkaline coating liquid having a pH value higher than 7, say, 10 or so, may dissolve out in contacting with an aqueous medium to exhibit a less satisfactory scale preventing effect. Furthermore, when the ingredients in the coating liquid of the present invention, i.e. Compounds (a) to (c), are used as an organic solution, the resultant coating films are also soluble when in contact with an aqueous medium, leading to a less satisfactory effectiveness of polymer scale prevention.

The mechanism by which a coating film with a remarkably improved effectiveness of polymer scale prevention is obtained by use of an acidic coating liquid is presumably as follows.

The water-soluble anoinic dye as Compound (a) has at least one group expressed by $-SO_3M$ or $-COOM$, where M is an alkali metal or ammonium ion, which is in an undissociated state in an organic solution but becomes dissociated in an aqueous solution according to the following equations representing the dissociation equilibria.

   (1)

   (2)

When the pH value of the solution is brought to 7 or below by adding the aforementioned pH adjustment agent to the solution in the equilibrium, a new equilibrium will be established according to the following equations.

   (3)

   (4)

Owing to the very low concentration of Compound (a) in the coating liquid, say, 0.01% to 5% by weight, no precipitates will be formed by the lowering of the pH value with the addition of the pH adjusting agent to a value of 7 or below or, preferably, 5 or below.

Drying of the coating liquid applied to the surfaces eliminates water from the coating liquid and, consequently, the equilibria expressed by the equations (3) and (4) above shift rightward resulting in the formation of coating films insoluble or hardly soluble in water having an excellent scale preventing effect.

In the method of the present invention, the inner walls of the polymerization reactor and other surfaces coming into contact with the monomer or monomers are first coated with the aqueous coating liquid and then dried by heating at a temperature of 40° to 100° C. Alternatively the aqueous coating liquid is applied to the surfaces heated in advance at a temperature of 40° to 100° C. In any case, the coated surfaces must be sufficiently dry before they are washed with water, whereupon polymerization is carried out in a conventional manner. The coating amount on the reactor walls and other surfaces according to the method of the present invention is approximately at the same level as in the prior art methods in which certain kinds of coating materials are employed. Namely, a sufficiently strong effect of polymer scale prevention can be obtained with a coating amount larger than 0.001 g/m² as dried on the reactor walls and the surfaces of the stirrer and the like.

The effectiveness of the method of the present invention is not limited to any particular types of polymerization. Accordingly, the method is effective in any types of polymerization including suspension polymerization, emulsion polymerization and bulk polymerization. The effectiveness of polymer scale prevention is not influenced by the additives conventionally introduced into the polymerization mixture, such as the suspending agents, e.g. partially saponified polyvinyl alcohol, methyl cellulose and the like; anionic surface active agents, e.g. sodium laurylsulfate, sodium dodecylbenzene sulfonate, sodium dioctylsulfosuccinate and the like; nonionic surface active agents, e.g. sorbitan monolaurate, polyoxyethylene alkyl ethers and the like; fillers, e.g. calcium carbonate, titanium dioxide and the like; stabilizers, e.g. tribasic lead sulfate, calcium stearate, dibutyltin dilaurate, dioctyltin mercaptide and the like; lubricants, e.g. rice wax, stearic acid and the like; plasticizers, e.g. dioctyl phthalate, dibutyl phthalate and the like; chain transfer agents, e.g. trichloroethylene, mercaptans and the like; pH adjusting agents; and polymerization initiators, e.g. diisopropyl peroxydicarbonate, $\alpha,\alpha'$-azobis-2,4-dimethylvaleronitrile, lauroyl peroxide, potassium persulfate, cumene hydroperoxide, p-menthane hydroperoxide and the like.

The vinyl monomers to be polymerized in accordance with the method of the present invention include vinyl halides, such as vinyl chloride; vinyl esters, such as vinyl acetate and vinyl propionate; acrylic acid, methacrylic acid and esters and salts thereof, maleic acid, fumaric acid and esters or anhydrides thereof; dienic monomers, such as butadiene, chloroprene and isoprene; styrene; acrylonitrile; vinylidene halides; and vinyl ethers.

The method of the present invention is especially suitable for the heterogeneous free radical polymerization in which the polymer formed separates out of the polymerization mixture as the polymerization reaction proceeds. A typical case of such a type of polymerization is the preparation of homo- or copolymers of a vinyl halide, vinylidene halide or a monomer mixture mainly composed thereof by suspension or emulsion polymerization in an aqueous medium.

The method of the present invention is particularly effective in preventing polymer scale deposition on the walls of a stainless steel polymerization reactor used in the preparation of polystyrene, polymethyl methacrylate, polyacrylonitrile by beads polymerization, the preparation of rubber latices, such as SBR and NBR, usually by emulsion polymerization, and the preparation of ABS resins.

The following examples illustrate the method of the present invention in further detail. In the table belonging to each example, the experiment with the mark * is for control and the experiment without the mark is for the present invention.

EXAMPLE 1

A stainless steel polymerization reactor of a 100 liter capacity equipped with a stirrer was employed. An aqueous coating liquid was prepared by dissolving C.I. Acid black 2 in a concentration of 1% by weight and by adjusting the pH to the value as indicated in Table 1 by use of sulfuric acid. The inner walls of the polymerization reactor and the surface of the stirrer were coated with the coating liquid prepared as above in a coating amount of 0.1 g/m² as dried, followed by drying under the conditions as given in the same table and washed with water. Into the thus treated polymerization reactor were introduced 26 kg of vinyl chloride monomer, 52 kg of deionized water, 26 g of partially saponified polyvinyl alcohol and 8 g of $\alpha,\alpha'$-azobis-2,4-dimethylvaleronitrile, and the polymerization was carried out by heating the polymerization mixture at 57° C. for 8 hours with agitation.

After completion of each polymerization run, the amount of the polymer scale deposited on the reactor walls was determined to give the results in g/m² as set out in the table. The results in the table demonstrate the influence of the pH adjustment and the drying conditions (temperature and time) over the formation of polymer scale. Specifically referring to Experiments No. 5 and No. 6 and comparing them with each other, it is pointed out that the extension of the drying time from 10 to 30 minutes resulted in reducing the formation of polymer scale from 300 to 200 g/m². This may be interpreted that insufficient drying results in unsatisfactory scale prevention.

Table 1

| Exp. No. | Coating compound | pH Adjustment | pH Value | Drying with or without heat | Scale (g/m²) |
|---|---|---|---|---|---|
| 1* | None | — | — | — | 1,500 |
| 2 | C.I. Acid Black 2 | Yes | 5.0 | 90° C., 10 min. | 0 |
| 3* | " | No | 10.8 | r.t., 10 min. | 1,200 |
| 4* | " | No | 10.8 | 90° C. 10 min. | 1,000 |
| 5* | " | Yes | 5.0 | r.t., 10 min. | 300 |
| 6* | " | Yes | 5.0 | r.t., 30 min. | 200 |

Note:
r.t. is room temperature.

EXAMPLE 2

The inner walls of a 1000 liter capacity stainless steel polymerization reactor and the surface of the stirrer were coated in a coating amount of 0.1 g/m² as dried with an aqueous coating liquid prepared by dissolving an anionic dye coating compound as indicated in Table 2 in a concentration of 1% by weight with a value of pH as indicated in the table adjusted by adding a pH adjusting agent in the table, followed by drying with heat and thorough washing with water.

Into the thus treated polymerization reactor were introduced 200 kg of vinyl chloride monomer, 400 kg of deionized water, 40 g of diisopropylperoxy dicarbonate, 250 g of partially saponified polyvinyl alcohol and 25 g of hydroxypropylmethyl cellulose, and the polymerization reaction was carried out at a temperature of 57° C.

for 12 hours with the stirrer driven. After completion of the polymerization reaction, the polymerization mixture was discharged out of the polymerization reactor and the reactor was washed with water and dried, to determine the amount of the polymer scale deposited on the reactor walls with the results as set out in the table.

tration of 1% by weight as indicated in Table 3 in a coating amount of 0.1 g/m² as dried.

Into the thus treated polymerization reactor were introduced 200 kg of vinyl chloride monomer, 400 kg of deionized water and the other ingredients including the polymerization initiator and the dispersing agent as indicated in the table and the polymerization reaction Table 2

| Exp. No. | Coating compound | pH Adjusting agent | pH Value | Drying with heat | Scale (g/m²) |
|---|---|---|---|---|---|
| 7* | Not used | — | — | — | 1,300 |
| 8* | C.I. Acid Black 2 | None | 10.8 | 90° C., 10 min. | 1,000 |
| 9* | C.I. Acid Black 2 | Sulfuric acid | 9.5 | 90° C., 10 min. | 500 |
| 10* | C.I. Acid Black 2 | Sulfuric acid | 8.0 | 90° C., 10 min. | 330 |
| 11 | C.I. Acid Black 2 | Sulfuric acid | 7.0 | 90° C., 10 min. | 51 |
| 12 | C.I. Acid Black 2 | Sulfuric Acid | 6.0 | 90° C., 10 min. | 15 |
| 13 | C.I. Acid Black 2 | Sulfuric acid | 5.0 | 90° C., 10 min. | 2 |
| 14 | C.I. Acid Black 2 | Sulfuric acid | 3.0 | 90° C., 10 min. | 2 |
| 15 | C.I. Direct Yellow 1 | Oxalic acid | 3.5 | 60° C., 30 min. | 3 |
| 16 | C.I. Acid Black 1 | Hydrochloric acid | 2.5 | 60° C., 30 min. | 11 |
| 17 | C.I. Acid Blue 158 | Hydrochloric acid | 6.5 | 60° C., 30 min. | 12 |
| 18 | C.I. Direct Blue 6 | Phosphoric acid | 5.0 | 60° C., 30 min. | 2 |
| 19 | C.I. Direct Violet 22 | Phytic acid | 5.0 | 60° C., 30 min. | 2 |
| 20 | C.I. Mordant Violet 5 | Nitric acid | 3.0 | 50° C., 60 min. | 5 |
| 21 | C.I. Direct Black 38 | Molybdic acid | 4.5 | 50° C., 60 min. | 5 |
| 22 | C.I. Acid Blue 116 | Lactic acid | 6.5 | 50° C., 60 min. | 11 |
| 23 | C.I. Direct Blue 106 | Lactic acid | 6.0 | 50° C., 60 min. | 8 |
| 24 | C.I. Direct Blue 71 | Maleic acid | 6.0 | 50° C., 60 min. | 9 |
| 25 | C.I. Mordant Blue 1 | Phsophoric acid | 4.0 | 40° C., 120 min. | 4 |
| 26 | C.I. Reactive Blue 2 | Phosphoric acid | 4.5 | 40° C., 120 min. | 4 |
| 27 | C.I. Acid Violet 78 | Glycollic acid | 5.0 | 40° C., 120 min. | 2 |
| 28 | C.I. Reactive Blue 18 | Thioglycollic acid | 4.0 | 40° C., 120 min. | 2 |
| 29 | C.I. Direct Orange 2 | Oxalic acid | 6.0 | 90° C., 10 min. | 23 |
| 30 | C.I. Acid Red 73 | Oxalic acid | 5.5 | 90° C., 10 min. | 20 |
| 31 | C.I. Direct Red 1 | Acetic acid | 4.5 | 90° C., 10 min. | 20 |
| 32 | C.I. Direct Violet 1 | Acetic acid | 5.0 | 90° C., 10 min. | 16 |
| 33 | C.I. Mordant Yellow 26 | Acetic acid | 5.0 | 90 C., 10 min. | 13 |
| 34 | C.I. Food Yellow 3 | Sulfuric acid | 6.5 | 90° C., 10 min. | 18 |
| 35 | C.I. Acid Yellow 38 | Sulfuric acid | 5.5 | 90° C., 10 min. | 12 |
| 36 | C.I. Reactive Blue 4 | Sulfuric acid | 4.5 | 90° C., 10 min. | 10 |
| 37 | C.I. Direct Red 186 | Sulfuric acid | 3.5 | 90° C., 10 min. | 8 |

EXAMPLE 3

The inner walls of a 1000 liter capacity stainless steel polymerization reactor and the surface of the stirrer were coated with an aqueous coating liquid in a concentration of 1% by weight as indicated in Table 3 in a coating amount of 0.1 g/m² as dried.

was carried out at a temperature of 57° C. for 10 hours with agitation. After the end of the above polymerization time, the polymerization mixture was discharged out of the reactor and the amount of the polymer scale deposited on the reactor walls was determined to give the results in g/m² as set out in the table.

Table 3

| Exp. No. | Coating liquid, the same as in: | Drying with heat | Initiator used, kg | Dispersing agent used, kg | Scale (g/m²) |
|---|---|---|---|---|---|
| 38 | Exp. No. 13 | 90° C., 10 min. | DMVN, 0.075 | PVA, 0.25 | 0 |
| 39 | Exp. No. 14 | 90° C., 10 min. | KPS, 0.13 | Na-LS, 2.5 | 1 |
| 40 | Exp. No. 18 | 90° C., 10 min. | APS, 0.13 + Ferrous chloride, 0.0013 | Na-DBS, 2.5 | 2 |
| 41 | Exp. No. 28 | 90° C., 10 min. | IPP, 0.075 | Na-LS, 2.5 + Cetyl alcohol, 2.5 | 0 |
| 42* | Exp. No. 4 | 90° C., 10 min. | KPS, 0.13 | Na-LS, 2.5 | 1,600 |
| 43* | Exp. No. 4 | 90° C., 10 min. | DMVN, 0.075 | PVA, 0.25 | 800 |

Note:
DMVN = α,α'-Azobis-2,4-dimethylvaleronitrile
KPS = Potassium persulfate
APS = Ammonium persulfate
IPP = Diisopropylperoxy dicarbonate
PVA = Partially saponified polyvinyl alcohol
Na-LS = Sodium laurylsulfate
Na-DBS = Sodium dodecylbenzene sulfonate

EXAMPLE 4

The inner walls and other surfaces of a combined installation of a 2-liter capacity vertical type stainless steel polymerization reactor and a 4-liter capacity horizontal type stainless steel polymerization reactor coming into contact with the monomer were coated with an aqueous coating liquid in a concentration of 1% by weight as indicated in Table 4 in a coating amount of 0.1 g/m² as dried, followed by drying in the conditions given in the table, washing with water and final drying.

Into the 2-liter capacity polymerization reactor were introduced 800 g of vinyl chloride monomer and 0.3 g of diisopropylperoxy dicarbonate, and the polymerization reaction was carried out by heating at a temperature of 60° C. for 2 hours with the stirrer driven at a speed of 900 r.p.m. Then the polymerization mixture in this polymerization reactor was transferred to the 4-liter capacity polymerization reactor charged in advance with 800 g of vinyl chloride monomer and 0.4 g of diisopropylperoxy dicarbonate, where the polymerization reaction was continued by heating at a temperature of 57° C. for 10 hours with the stirrer driven at a speed of 100 r.p.m. After completion of the polymerization reaction, the polymerization mixture was discharged out of the reactor and the amounts of the polymer scale deposited on the inner walls of both of the polymerization reactors were determined to give the results as set out in the table.

Table 4

| Exp. No. | Coating liquid, the same as in: | Drying with heat | Scale formed (g/m²) within: 2-liter Reactor | 4-liter Reactor |
|---|---|---|---|---|
| 44* | Not used | — | 900 | 800 |
| 45 | Exp. No. 13 | 90° C., 10 min. | 10 | 1 |
| 46 | Exp. No. 27 | 90° C., 10 min. | 5 | 2 |
| 47* | Exp. No. 4 | 90° C., 10 min. | 700 | 700 |

EXAMPLE 5

The inner walls of a 100 liter capacity glass-lined polymerization reactor and the surface of the stirrer were coated with an aqueous coating liquid in a concentration of 1% by weight as indicated in Table 5 below in a coating amount of 0.1 g/m² as dried, followed by drying at 90° C. for 10 minutes and thorough washing with water. Into the thus treated polymerization reactor were introduced 20 kg of vinyl chloride monomer, 40 kg of deionized water, 13 g of potassium persulfate and 250 g of sodium laurylsulfate, and the polymerization reaction was carried out at a temperature of 50° C. for 12 hours with agitation. After the end of the above polymerization time, the polymerization mixture was discharged out of the reactor and the amount of the polymer scale deposited on the reactor walls was determined to give the results in g/m² as set out in the table.

Table 5

| Exp. No. | Coating liquid, the same as in: | Drying with heat | Scale (g/m²) |
|---|---|---|---|
| 48* | Not used | — | 700 |
| 49 | Exp. No. 13 | 90° C., 10 min. | 0 |
| 50 | Exp. No. 14 | " | 0 |
| 51* | Exp. No. 4 | " | 400 |

EXAMPLE 6

The inner walls of a 100 liter capacity stainless steel polymerization reactor and the stirrer installed therein were heated in advance, and a coating liquid in a concentration of 1% by weight as indicated in Table 6 was applied on to the thus heated surfaces in a coating amount of 0.1 g/m² as dried, followed by washing with water after drying up of the coating liquid. The polymerization reaction was carried out in the thus treated polymerization reactor under the same conditions as in Example 1. After completion of the polymerization reaction, the amount of the polymer scale deposited on the reactor walls was determined to give the results as set out in the table.

Table 6

| Exp. No. | Coating liquid, the same as in: | Temperature to which the wall and stirrer were heated | Scale (g/m²) |
|---|---|---|---|
| 52 | Exp. No. 13 | 90° C. | 2 |
| 53 | Exp. No. 27 | 70° C. | 5 |
| 54* | Exp. No. 4 | 90° C. | 1,000 |

EXAMPLE 7

The inner walls of a 400 liter capacity stainless steel polymerization reactor and the surface of the stirrer were coated with a coating liquid in a concentration of 1% by weight as indicated in Table 7 in a coating amount of 0.1 g/m² as dried, followed by drying with heat and washing with water. Into the thus treated polymerization reactor were introduced 200 kg of deionized water, 100 kg of styrene monomer, 1 kg of calcium phosphate, 10 g of sodium dodecylbenzene sulfonate and 100 g of benzoyl peroxide, and the polymerization reaction was carried out at a temperature of 90° C. for 11 hours with agitation. After completion of the polymerization reaction, the amount of the polymer scale deposited on the reactor walls was determined to give the results in g/m² as set out in the table.

Table 7

| Exp. No. | Coating liquid, the same as in: | Drying with heat | Scale (g/m²) |
|---|---|---|---|
| 55* | Not used | — | 280 |
| 56 | Exp. No. 19 | 60° C., 30 min. | 0 |
| 57 | Exp. No. 28 | 40° C., 120 min. | 2 |
| 58* | Exp. No. 10 | 90° C., 10 min. | 200 |

EXAMPLE 8

The inner walls of the same polymerization reactor as used in Example 7 and the surface of the stirrer were coated with a coating liquid in a concentration of 1% by weight as indicated in Table 8 in a coating amount of 0.1 g/m² as dried, followed by drying with heat and washing with water. The polymerization reaction of styrene was carried out under the same conditions as in Example 7 and, after completion of the polymerization reaction, the polymerization mixture was discharged out of the reactor which was subsequently washed with water. This cycle of the operations was repeated and the number of the polymerization runs was recorded in which the amount of the polymer scale did not exceed 1 g/m² to give the results as set out in the table.

Table 8

| Exp. No. | Coating liquid, the same as in: | Drying with heat | No. of polymerization runs |
|---|---|---|---|
| 59* | Not used | — | 0 |
| 60 | Exp. No. 14 | 90° C., 10 min. | 13 |
| 61* | Exp. No. 4 | " | 0 |

EXAMPLE 9

The inner walls of a 400 liter capacity stainless steel polymerization reactor and the surface of the stirrer were coated with a coating liquid in a concentration of 1% by weight as indicated in Table 9 in a coating amount of 0.1 g/m² as dried, followed by drying with heat and washing with water. Into the thus treated polymerization reactor were introduced 180 kg of deionized water, 75 kg of 1,3-butadiene monomer, 25 kg of styrene monomer, 4.5 kg of sodium laurylsulfate, 280 g of tert-dodecylmercaptan and 300 g of potassium persulfate, and the polymerization reaction was carried out at a temperature of 50° C. for 12 hours with agitation. After completion of the polymerization reaction, the amount of the polymer scale deposited on the reactor walls was determined to give the results in g/m² as set out in the table.

Table 9

| Exp. No. | Coating liquid, the same as in: | Drying with heat | Scale (g/m²) |
|---|---|---|---|
| 62* | Not used | — | 430 |
| 63 | Exp. No. 14 | 90° C., 10 min. | 1 |
| 64 | Exp. No. 28 | " | 2 |
| 65* | Exp. No. 4 | " | 300 |
| 66* | Exp. No. 10 | " | 250 |

EXAMPLE 10

The inner walls of a 400 liter capacity stainless steel polymerization reactor and the surface of the stirrer were coated with a coating liquid in a concentration of 1% by weight as indicated in Table 10 in a coating amount of 0.1 g/m² as dried, followed by drying with heat and washing with water. Into the thus treated polymerization reactor were introduced 180 kg of deionized water, 74 kg of 1,3-butadiene monomer, 26 kg of acrylonitrile monomer, 4 kg of sodium oleate, 1 kg of oleic acid, 500 g of tert-dodecylmercaptan, 100 g of sodium pyrophosphate and 300 g of potassium persulfate, and the polymerization reaction was carried out at a temperature of 40° C. for 12 hours with agitation. After completion of the polymerization reaction, the amount of the polymer scale deposited on the reactor walls was determined to give the results as set out in the table.

Table 10

| Exp. No. | Coating liquid, the same as in: | Drying with heat | Scale (g/m²) |
|---|---|---|---|
| 67* | Not used | — | 330 |
| 68 | Exp. No. 14 | 90° C., 10 min. | 1 |
| 69* | Exp. No. 4 | " | 280 |
| 70* | Exp. No. 10 | " | 270 |

EXAMPLE 11

The inner walls of a 400 liter capacity glass-lined polymerization reactor and the surface of the stirrer were coated with a coating liquid in a concentration of 1% by weight as indicated in Table 11 in a coating amount of 0.1 g/m² as dried, followed by drying with heat and washing with water. Into the thus treated polymerization reactor were introduced 180 kg of deionized water, 40 kg of 1,3-butadiene monomer, 54 kg of methacrylate monomer, 4 kg of styrene monomer, 4.5 kg of sodium laurylbenzene sulfonate, 280 g of tert-dodecylmercaptan and 300 g of potassium persulfate, and the polymerization reaction was carried out at a temperature of 50° C. for 10 hours with agitation. After completion of the polymerization reaction, the amount of the polymer scale deposited on the reactor walls was determined to give the results in g/m² as set out in the table.

Table 11

| Exp. No. | Coating liquid, the same as in: | Drying with heat | Scale (g/m²) |
|---|---|---|---|
| 71* | Not used | — | 130 |
| 72 | Exp. No. 14 | 90° C., 10 min. | 0 |
| 73* | Exp. No. 4 | " | 100 |

EXAMPLE 12

Aqueous coating liquids were prepared each by dissolving a water-soluble anionic dye (Coating Compound) as indicated in Table 12 into water in a concentration of 1% by weight, followed by adjustment of their pH values by aid of various pH adjusting agents as indicated in the table and addition of various monovalent alcohols as indicated in the table in the amounts expressed by parts by weight, each based on 100 parts by weight of the aqueous solution.

The inner walls of a 1000-liter stainless steel polymerization reactor and the surface of the stirrer were coated with the coating liquid thus prepared in a coating amount of 0.1 g/m² as dried, followed by drying with heat under the conditions as indicated in the table.

Into the thus treated polymerization reactor were introduced 200 kg of vinyl chloride monomer, 400 kg of deionized water, 250 g of partially saponified polyvinyl alcohol, 25 g of hydroxypropylmethyl cellulose and 75 g of diisopropylperoxy dicarbonate and the polymerization reaction was carried out at a temperature of 57° C. for 10 hours with agitation.

After completion of the polymerization reaction, the amount of the polymer scale deposited on the reactor walls was determined to give the results in g/m² as set out in the table. Among others, Experiments No. 87 and No. 88 show that the use of methanol or ethanol resulted in somewhat more scale formation compared to other experiments where other alcohols having more carbon atoms were used. Further, Experiments No. 89 and 90 where surface active agents were used instead of the monovalent alcohols show that the surface active agents have an adverse effect on polymer scale prevention.

tion) and pH adjusting agents as indicated in Table 13 were dissolved in water in amounts such that a total concentration of the three compounds becomes to be about 0.1% by weight, and the pH of the solution was adjusted to the value indicated in the same table by adding the pH adjusting agent. The inner walls of a 100-liter capacity stainless steel polymerization reactor were coated with the above prepared coating liquid, and the suspension polymerization of vinyl chloride monomer were undertaken under the substantially same conditions as in Example 1 except that the coating amount was 0.01 g/m² instead of 0.1 g/m² as dried. After completion of the polymerization reaction, the amount of the polymer scale deposited on the reactor walls was determined to give the results in g/m² as set out in the table.

Table 12

| Exp. No. | Coating compound | pH Adjusting agent | pH Value | Alcohol added, parts | Drying with heat | (g/m²) |
|---|---|---|---|---|---|---|
| 74* | None | — | — | None | — | 1,500 |
| 75 | C.I. Acid Black 2 | Sulfuric acid | 6.0 | None | 90° C., 10 min. | 15 |
| 76 | C.I. Acid Black 2 | Sulfuric acid | 6.0 | iso-Butyl alcohol, 10 | 90° C., 10 min. | 1 |
| 77 | C.I. Acid Black 2 | Sulfuric acid | 5.0 | iso-Butyl alcohol | 90° C., 10 min. | 0 |
| 78 | C.I. Acid Blue 158 | Hydrochloric acid | 6.5 | n-Butyl alcohol, 5 | 90° C., 10 min. | 6 |
| 79 | C.I. Direct Black 38 | Molybdic acid | 4.5 | sec-Butyl alcohol, 10 | 60° C., 30 min. | 2 |
| 80 | C.I. Acid Blue 116 | Lactic acid | 6.5 | tert-Butyl alcohol, 10 | 50° C., 60 min. | 5 |
| 81 | C.I. Direct Blue 106 | Lactic acid | 6.0 | tert-Amyl alcohol, 5 | 50° C., 60 min. | 4 |
| 82 | C.I. Mordant Violet 5 | Nitric acid | 3.0 | sec-Amyl alcohol, 10 | 50° C., 60 min. | 2 |
| 83 | C.I. Direct Violet 22 | Phytic acid | 5.0 | iso-Butyl alcohol, 5 | 60° C., 30 min. | 1 |
| 84 | C.I. Direct Violet 1 | Acetic acid | 5.0 | n-Butyl alcohol, 10 | 90° C., 10 min. | 7 |
| 85 | C.I. Acid Violet 78 | Glycollic acid | 5.5 | tert-Amyl alcohol, 10 | 40° C., 120 min. | 1 |
| 86 | C.I. Mordant Blue 1 | Phosphoric acid | 4.0 | iso-Butyl alcohol, 10 | 40° C., 120 min. | 2 |
| 87 | C.I. Acid Black 2 | Sulfuric acid | 6.0 | Methanol, 10 | 90° C., 10 min. | 10 |
| 88 | C.I. Acid Black 2 | Sulfuric acid | 6.0 | Ethanol, 10 | 90° C., 10 min. | 10 |
| 89* | C.I. Acid Black 2 | Sulfuric acid | 5.0 | Sodium lauryl sulfate, 0.02 | 90° C., 10 min. | 300 |
| 90* | C,I. Acid Black 2 | Sulfuric acid | 5.0 | Polyethylene glycol surfactant, 1.0 | 90° C., 10 min. | 500 |

EXAMPLE 13

Each of the anionic dyes (Compound (a) by C.I. designation), cationic dyes (Compound (b) by C.I. designa- Table 13

| Exp. No. | Compound (a) | Compound (b) | Weight ratio (a)/(b) | pH Adjusting agent | pH Value | Drying with heat | Scale (g/m²) |
|---|---|---|---|---|---|---|---|
| 91* | None | None | — | None | — | — | 1,500 |
| 92* | Acid Black 2 | None | 100/0 | None | 10.8 | 90° C., 10 min. | 1,000 |
| 93* | None | Basic Orange 14 | 0/100 | None | 5.0 | 10 min. | 1,000 |
| 94 | Acid Black 2 | Basic Orange 14 | 100/20 | P₁ | 6.0 | 50° C., 10 min. | 10 |
| 95 | Acid Black 2 | Basic Orange 14 | " | P₁ | 2.5 | 50° C., 10 min. | 0 |
| 96 | Acid Black 2 | Basic Orange 14 | 100/30 | P₁ | 2.5 | 50° C., 10 min. | 0 |
| 97 | Acid Black 2 | Basic Orange 14 | 100/40 | P₁ | 2.5 | 70° C., 7 min. | 0 |
| 98 | Acid Blue 59 | Basic Blue 9 | 100/25 | P₁ | 5.0 | 50° C., 10 min. | 10 |

Table 13-continued

| Exp. No. | Compound (a) | Compound (b) | Weight ratio (a)/(b) | pH Adjusting agent | pH Value | Drying with heat | Scale (g/m$^2$) |
|---|---|---|---|---|---|---|---|
| 99 | Acid Blue 59 | Basic Blue 9 | 100/25 | P$_2$ | 2.5 | 50° C., 10 min. | 0 |
| 100 | Acid Blue 59 | Basic Red 2 | " | P$_1$ | 2.0 | 70° C., 7 min. | 0 |
| 101 | Acid Orange 7 | Basic Blue 1 | 100/20 | P$_1$ | 2.5 | 50° C., 10 min. | 4 |
| 102 | Acid Blue 40 | Basic Orange 15 | 100/30 | P$_1$ | 3.0 | 50° C., 10 min. | 3 |
| 103 | Acid Blue 1 | Basic Yellow 11 | 100/15 | P$_1$ | 2.5 | 50° C., 10 min. | 5 |
| 104 | Direct Blue 1 | Basic Blue 12 | 100/20 | P$_1$ | 2.5 | 50° C., 10 min. | 0 |
| 105 | Direct Orange 26 | Basic Red 1 | 100/40 | P$_1$ | 3.0 | 50° C. 10 min. | 1 |
| 106 | Direct Brown 37 | Basic Blue 24 | 100/25 | P$_1$ | 2.5 | 50° C., 10 min. | 3 |
| 107 | Direct Green 26 | Basic Blue 25 | 100/32 | P$_1$ | 2.0 | 50° C., 10 min. | 2 |
| 108 | Direct Blue 71 | Basic Violet 14 | 100/23 | P$_3$ | 2.5 | 50° C., 10 min. | 1 |
| 109 | Direct Red 31 | Basic Blue 9 | 100/27 | P$_1$ | 2.0 | 50° C., 10 min. | 4 |
| 110 | Direct Brown 1 | Basic Green 5 | 100/18 | P$_1$ | 3.0 | 50° C., 10 min. | 5 |

Note:
In the column "pH Adjusting agent"
P$_1$ = Phytic acid
P$_2$ = 2-Sodium salt of phytic acid
P$_3$ = 2-Triethanolamine salt of phytic acid

EXAMPLE 14

Each of the anionic dyes (Compound (a) by C.I. designation), cationic dyes (Compound (b) by C.I. designation) and pH adjusting agents as indicated in Table 14 were dissolved in water in amounts such that a total concentration of the three compounds becomes to be about 0.1% by weight, and the pH of the solution was adjusted to the value indicated in the same table by adding the pH adjusting agent. The inner walls of a 120-liter capacity stainless steel polymerization reactor and the surface of the stirrer were coated with the coating liquid thus prepared in a coating amount of 0.01 g/m$^2$ as dried, followed by drying with heat and thorough washing with water.

Into the thus treated polymerization reactor were introduced 50 kg of styrene monomer, 43.2 kg of deionized water, 120 g of hydroxy apatite, 0.62 g of sodium hydrogensulfite, 125 g of benzoyl peroxide and 25 g of tert-butyl perbenzoate, and the polymerization reaction was carried out at a temperature of 90° C. for 7 hours with agitation. After completion of the polymerization reaction, the amount of the polymer scale deposited on the reactor walls was determined to give the results as set out in the table.

Table 14

| Exp. No. | Compound (a) | Compound (b) | Weight ratio (a)/(b) | pH Adjusting agent | pH Value | Drying with heat | Scale (g/m$^2$) |
|---|---|---|---|---|---|---|---|
| 111* | None | None | — | None | — | — | 280 |
| 112* | Acid Black 2 | None | 100/0 | None | 10.8 | 90° C., 10 min. | 220 |
| 113 | Acid Black 2 | Basic Blue 9 | 100/20 | P$_1$ | 2.0 | 50° C., 10 min. | 0 |
| 114 | Acid Black 2 | Basic Red 1 | 100/40 | P$_1$ | 3.0 | 50° C., 10 min. | 2 |
| 115 | Acid Black 2 | Basic Blue 5 | 100/50 | P$_1$ | 2.5 | 50° C., 10 min. | 0 |
| 116 | Acid Black 2 | Basic Blue 6 | 100/30 | P$_1$ | 2.5 | 50° C., 10 min. | 1 |
| 117 | Direct lack 2 | Basic Blue 12 | 100/45 | P$_1$ | 2.5 | 50° C., 10 min. | 2 |
| 118 | Acid Blue 86 | Basic Orange 2 | 100/23 | P$_4$ | 2.5 | 50° C., 10 min. | 3 |
| 119 | Direct Orange 3 | Basic Violet 3 | 100/18 | P$_1$ | 2.0 | 70° C., 5 min. | 1 |
| 120 | Direct Black 19 | Basic Yellow 11 | 100/27 | P$_1$ | 2.0 | 70° C., 5 min. | 0 |
| 121 | Acid Blue 71 | Basic Red 12 | 100/30 | P$_1$ | 2.5 | 70° C., 5 min. | 3 |
| 122 | Direct Blue 158 | Basic Green 5 | 100/25 | P$_1$ | 4.0 | 70° C., 5 min. | 3 |
| 123 | Direct Brown 1 | Basic Orange 15 | 100/20 | P$_5$ | 2.5 | 40° C., 15 min. | 0 |
| 124 | Direct Green 1 | Basic Blue 16 | 100/30 | P$_1$ | 4.0 | 40° C., 15 min. | 2 |

Table 14-continued

| Exp. No. | Compound (a) | Compound (b) | Weight ratio (a)/(b) | pH Adjusting agent | pH Value | Drying with heat | Scale (g/m²) |
|---|---|---|---|---|---|---|---|
| 125 | Direct Green 26 | Basic Black 72 | 100/34 | P₁ | 3.0 | 40° C., 15 min. | 1 |
| 126 | Acid Red 80 | Basic Red 2 | 100/26 | P₁ | 2.5 | 50° C., 10 min. | 0 |
| 127 | Acid Red 52 | Basic Red 1 | 100/23 | P₁ | 2.5 | 50° C., 10 min. | 3 |
| 128 | Acid Yellow 7 | Basic Blue 25 | 100/40 | P₁ | 2.5 | 50° C., 10 min. | 2 |
| 129 | Acid Orange 3 | Basic Orange 14 | 100/20 | P₁ | 2.5 | 50° C., 10 min. | 0 |

Note:
In the column "pH Adjusting agent":
$P_1$ = Phytic acid
$P_4$ = 2-Ethylamine salt of phytic acid
$P_5$ = 2-Ammonium salt of phytic acid

EXAMPLE 15

Each of the anionic dyes (Compound (a) by C.I. designation), cationic dyes (Compound (b) by C.I. designation) and pH adjusting agents as indicated in Table 15 were dissolved in water in amounts such that a total concentration of the three compounds becomes to be about 0.1% by weight, and the pH of the solution was adjusted to the value indicated in the same table by adding the pH adjusting agent. The inner walls of a 400 liter capacity stainless steel polymerization reactor and the surface of the stirrer were coated with the thus prepared coating liquid in a coating amount of 0.01 g/m² as dried, followed by drying with heat and washing with water.

Into the thus treated polymerization reactor were introduced 80 kg of vinylidene chloride monomer, 20 kg of vinyl chloride monomer, 200 kg of deionized water, 150 g of benzoyl peroxide, 125 g of partially saponified polyvinyl alcohol and 25 g of methyl cellulose and the polymerization reaction was carried out at a temperature of 60° C. for 12 hours with agitation. After completion of the polymerization reaction, the amount of the polymer scale deposited on the reactor walls was determined to give the results as set out in the table.

Table 15

| Exp. No. | Compound (a) | Compound (b) | Weight ratio (a)/(b) | pH Adjusting agent | pH Value | Drying with heat | Scale (g/m²) |
|---|---|---|---|---|---|---|---|
| 130* | None | None | — | None | — | — | 900 |
| 131* | Acid Black 2 | None | 100/0 | None | 10.8 | 90° C., 10 min. | 800 |
| 132 | Acid Blue 59 | Basic Green 5 | 100/40 | P₁ | 3.0 | 90° C., 10 min. | 1 |
| 133 | Acid Black 124 | Basic Blue 25 | 100/20 | P₁ | 2.0 | 90° C., 10 min. | 0 |
| 134 | Direct Black 32 | Basic Orange 14 | 100/30 | P₂ | 3.0 | 90° C., 10 min. | 0 |
| 135 | Direct Black 77 | Basic Orange 15 | 100/23 | P₁ | 2.0 | 40° C., 15 min. | 3 |
| 136 | Direct Orange 97 | Basic Blue 16 | 100/33 | P₁ | 2.5 | 40° C., 15 min. | 1 |
| 137 | Acid Blue 113 | Basic Orange 2 | 100/24 | P₁ | 2.0 | 40° C., 15 min. | 1 |
| 138 | Direct Brown 37 | Basic Red 12 | 100/27 | P₁ | 2.5 | 90° C., 2 min. | 0 |
| 139 | Direct Blue 71 | Basic Brown 1 | 100/50 | P₁ | 3.0 | 90° C., 2 min. | 2 |

Note:
In the column "pH Adjusting agent":
$P_1$ = Phytic acid
$P_2$ = 2-Sodium salt of phytic acid

EXAMPLE 16

The inner walls of a 200 liter capacity stainless steel polymerization reactor and the surface of the stirrer were coated with a coating liquid in a concentration of 0.1% by weight as indicated in Table 16 in a coating amount of 0.01 g/m² as dried, followed by drying with heat and washing with water.

Into the thus treated polymerization reactor were introduced 50 kg of styrene monomer, 50 kg of deionized water, 125 g of partially saponified polyvinyl alcohol, 25 g of methyl cellulose and 150 g of benzoyl peroxide, and the polymerization reaction was carried out at a temperature of 90° C. for 7 hours with agitation. After completion of the polymerization reaction, the amount of the polymer scale deposited on the reactor walls was determined to give the results as set out in the table.

Table 16

| Exp. No. | Coating liquid, the same as in: | Drying with heat | Scale (g/m²) |
|---|---|---|---|
| 140* | Not used | — | 800 |
| 141* | Exp. No. 4 | 90° C., 10 min. | 600 |

Table 16-continued

| Exp. No. | Coating liquid, the same as in: | Drying with heat | Scale (g/m²) |
| --- | --- | --- | --- |
| 142 | Exp. No. 96 | 50° C., 10 min. | 0 |
| 143 | Exp. No. 99 | " | 1 |
| 144 | Exp. No. 104 | " | 2 |
| 145 | Exp. No. 108 | " | 5 |
| 146 | Exp. No. 113 | 60° C., 10 min. | 0 |
| 147 | Exp. No. 120 | 70° C., 7 min. | 0 |
| 148 | Exp. No. 124 | 40° C., 15 min. | 0 |
| 149 | Exp. No. 129 | 50° C., 10 min. | 2 |
| 150 | Exp. No. 134 | " | 3 |
| 151 | Exp. No. 137 | 40° C., 15 min. | 1 |

EXAMPLE 17

The inner walls of a 250 liter capacity stainless steel polymerization reactor and the surface of the stirrer were coated with a coating liquid in a concentration of 0.1% by weight as indicated in Table 17 in a coating amount of 0.01 g/m² as dried, followed by drying with heat and thorough washing water.

Into the thus treated polymerization reactor were introduced 60 kg of styrene monomer, 40 kg of acrylonitrile monomer, 100 kg of deionized water, 2 kg of hydroxy apatite, 40 g of sodium laurylsulfate, 300 g of tert-dodecylmercaptan and 400 g of lauroyl peroxide. The polymerization reaction was carried out with stepwise elevation of temperature beginning at 70° C. for 1 hour, then increasing the temperature from 70° C. to 80° C. taking about 2 hours and finally at 80° C. for 1 hour to prepare the copolymer of styrene and acrylonitrile.

After completion of the polymerization reaction, the amount of the polymer scale deposited on the reactor walls was determined to give the results as set out in the table.

Table 17

| Exp. No. | Coating liquid, the same as in: | Drying with heat | Scale (g/m²) |
| --- | --- | --- | --- |
| 152* | Not used | — | 1,000 |
| 153* | Exp. No. 4 | 90° C., 10 min. | 800 |
| 154 | Exp. No. 99 | 50° C., 10 min. | 0 |
| 155 | Exp. No. 105 | " | 3 |
| 156 | Exp. No. 107 | " | 5 |
| 157 | Exp. No. 113 | 60° C., 10 min. | 0 |
| 158 | Exp. No. 134 | 50° C., 10 min. | 0 |
| 159 | Exp. No. 137 | " | 2 |

EXAMPLE 18

The inner walls of a 1000 liter capacity stainless steel polymerization reactor and the surface of the stirrer were coated with a coating liquid in a concentration of 0.1% by weight as indicated in Table 18 in a coating amount of 0.01 g/m² as dried, followed by drying with heat and thorough washing with water.

Into the thus treated polymerization reactor were introduced 200 kg of vinyl chloride monomer, 400 kg of deionized water, 250 g of hydroxypropylmethyl cellulose, 250 g of sorbitan monolaurate and 50 g of α,α'-azobis-2,4-dimethylvaleronitrile and the polymerization reaction was carried out at a temperature of 57° C. for 12 hours with agitation.

After completion of the polymerization reaction, the polymerization mixture was discharged out of the reactor which was subsequently washed with water and the polymerization runs were repeated under the same conditions as above to record the number of the polymerization runs performed without the deposition of polymer scale exceeding 1 g/m². The results are set out in the table.

Table 18

| Exp. No. | Coating liquid, the same as in: | Drying with heat | No. of polymerization runs |
| --- | --- | --- | --- |
| 160* | Not used | — | 0 |
| 161* | Exp. No. 4 | 90° C., 10 min. | 0 |
| 162 | Exp. No. 95 | 50° C., 10 min. | 30 |
| 163 | Exp. No. 96 | " | 40 |
| 164 | Exp. No. 99 | " | 20 |
| 165 | Exp. No. 104 | " | 14 |
| 166 | Exp. No. 113 | " | 26 |

EXAMPLE 19

The same experimental procedures were repeated as in Example 13 except that there were employed the coating liquids admixed with a monovalent alcohol as indicated in Table 19 to give the results of polymer scale deposition as indicated in the table. In these experiments, the coated surfaces were dried by heating at 50° C. for 10 minutes.

The addition of the monovalent alcohol to the coating liquid was effective in improving the spreading of the coating liquid over the stainless steel surfaces of the reactor enabling easy operation of coating.

Table 19

| Exp. No. | Coating liquid used | Scale (g/m²) |
| --- | --- | --- |
| 167 | Mixture of the coating liquid used in Exp. No. 94 and 10% of iso-butyl alcohol | 7 |
| 168 | Mixture of the coating liquid used in Exp. No. 101 and 5% of sec-butyl alcohol | 0 |
| 169 | Mixture of the coating liquid used in Exp. No. 103 and 10% of tert-butyl alcohol | 2 |
| 170 | Mixture of the coating liquid used in Exp. No. 106 and 10% of tert-amyl alcohol | 0 |
| 171 | Mixture of the coating liquid used in Exp. No. 110 and 10% of sec-amyl alcohol | 3 |

Note:
Percentages are all by weight.

EXAMPLE 20

The inner walls of a 100 liter capacity stainless steel polymerization reactor and the surface of the stirrer coming into contact with the monomer were coated in a coating amount of 0.1 g/m² with a coating liquid prepared by dissolving in water each of the anionic dyes (Compound (a) by C.I. designation) and the metal salts (Compound (c)) in a ratio by weight as indicated in Table 20 in a total concentration of 1% by weight, followed by adjustment of the pH value by addition of hydrochloric acid and subsequently dried by heating and thoroughly washed with water.

Into the thus treated polymerization reactor were introduced 26 kg of vinyl chloride monomer, 52 kg of deionized water, 26 g of partially saponified polyvinyl alcohol and 8 g of α,α'-azobis-2,4-dimethylvaleronitrile and the polymerization reaction was carried out at a temperature of 57° C. for 8 hours with agitation. After completion of the polymerization reaction, the amount of the polymer scale deposited on the reactor walls was determined to give the results as set out in the table.

Table 20

| Exp. No. | Compound (a) | Compound (c) | Weight ratio (a)/(c) | pH Value | Drying with heat | Scale (g/m$^2$) |
|---|---|---|---|---|---|---|
| 201* | None | None | — | — | — | 1,500 |
| 202* | Acid Black 2 | None | 100/0 | 10.8 | 90° C., 10 min. | 1,000 |
| 203 | Acid Black 2 | Sodium silicate | 100/100 | 6.0 | 90° C., 10 min. | 12 |
| 204 | Acid Black 2 | Sodium silicate | 100/100 | 50 | 90° C., 10 min. | 0 |
| 205 | Acid Black 2 | Sodium silicate | 100/100 | 3.0 | 90° C., 10 min. | 1 |
| 206 | Mordant Violet 5 | Potassium silicate | 100/50 | 5.0 | 90° C., 10 min. | 3 |
| 207 | Direct Blue 71 | Sodium silicate | 100/100 | 5.0 | 90° C., 10 min. | 2 |
| 208 | Acid Black 1 | Sodium silicate | 100/100 | 5.0 | 80° C., 30 min. | 0 |
| 209 | Direct Black 1 | Sodium silicate | 100/25 | 4.5 | 90° C., 5 min. | 1 |
| 210 | Mordant Black 5 | Sodium silicate | 25/100 | 3.5 | 90° C., 5 min. | 0 |
| 211 | Direct Red 1 | Sodium silicate | 100/20 | 5.0 | 90° C., 5 min. | 2 |
| 212* | None | Sodium silicate | 0/100 | 10.0 | 90° C., 5 min. | 900 |
| 213* | None | Iron(II) chloride | 0/100 | 3.0 | 90° C., 10 min. | 1,150 |
| 214* | None | Iron(III) chloride | 0/100 | 5.0 | 90° C., 10 min. | 1,200 |
| 215 | Acid Black 2 | Iron(II) chloride | 100/13 | 5.0 | 90° C., 10 min. | 0 |
| 216 | Acid Black 2 | Calcium chloride | 100/8 | 5.0 | 90° C., 10 min. | 0 |
| 217 | Direct Blue 6 | Copper (II) acetate | 100/7 | 5.0 | 40° C., 120 min. | 1 |
| 218 | Mordant Blue 1 | Iron(II) nitrate | 100/13 | 3.0 | 90° C., 10 min. | 1 |
| 219 | Direct Orange 10 | Zinc chloride | 100/7 | 5.0 | 90° C., 10 min. | 1 |
| 220 | Acid Yellow 38 | Iron(II) chloride | 100/7 | 4.0 | 90° C., 5 min. | 2 |
| 221 | Acid Black 2 | Iron(II) chloride/ zinc acetate (1:4) | 100/3 | 5.0 | 90° C., 10 min. | 0 |

EXAMPLE 21

The inner walls of a 1000 liter capacity stainless steel polymerization reactor and the surface of the stirrer were coated with a coating liquid in a concentration of 1% by weight as indicated in Table 21 in a coating amount of 0.1 g/m$^2$ as dried, followed by drying in the conditions as shown in the table.

Into the thus treated polymerization reactor were introduced 200 kg of vinyl chloride monomer, 400 kg of deionized water and other ingredients as indicated in the table and the polymerization reaction was carried out at a temperature of 57° C. for 10 hours with the stirrer driven. After completion of the polymerization reaction, the amount of the polymer scale deposited on the reactor walls was determined to give the results in g/m$^2$ as set out in the table.

Experiments No. 223 and No. 224 were intended for demonstrating the effectiveness of the method of the present invention in the copolymerization of vinyl chloride and vinyl acetate. The amount of vinyl chloride used was 200 kg in each experiment, while those of vinyl acetate were 10 kg in Experiment 223 and 37.5 kg in Experiment 224.

Table 21

| Exp. No. | Coating liquid, the same as in: | Drying with heat | Initiator used, kg | Dispersing agent used, kg | Additive used, kg | Scale (g/m$^2$) |
|---|---|---|---|---|---|---|
| 222 | Exp. #204 | 60° C., 120 min. | DMVN, 0.05 | HPMC, 0.25 +SML, 0.25 | None | 0 |
| 223 | Exp. #205 | 70° C., 60 min. | DMVN, 0.05 | PVA, 0.25 | None | 0 |
| 224 | Exp. #208 | 80° C., 30 min. | DMVN, 0.05 | " | None | 0 |
| 225 | Exp. #210 | 90° C., 5 min. | LPO, 1.3 | " | Stearic acid, 0.25 | 0 |
| 226 | Exp. #220 | 90° C., 5 min. | DMVN, 0.075 | PVA, 0.25 HPMC, 0.25 | None | 0 |
| 227 | Exp. #216 | 90° C., 5 min. | DMVN, 0.05 | +SML, 0.25 | None | 0 |
| 228 | Exp. #219 | 90° C., | LPO, | | Stearic | |

Table 21-continued

| Exp. No. | Coating liquid, the same as in: | Drying with heat | Initiator used, kg | Dispersing agent used, kg | Additive used, kg | Scale (g/m$^2$) |
|---|---|---|---|---|---|---|
| 229 | Exp. #221 | 90° C., 5 min. | IPP 0.05 | PVA, 0.25 | acid, 0.25 | 0 |
| | | 5 min. | 1.3 | PVA, 0.25 +methyl cellulose, 0.05 | | |
| 230* | Exp. #213 | 90° C., 10 min. | DMVN, 0.075 | PVA, 0.25 | (**) | 0 |
| 231* | Exp. #213 | 90° C., 10 min. | KPS, 0.13 | Na-LS, 2.5 | None | 1,200 |
| | | | | | None | 1,500 |

Note:
(**) Potassium stearate, 2.5 + rice wax, 3.0 + dioctyl tin mercaptide, 1.75 + polyethylene wax, 0.25.
DMVN = α,α'-Azobis-2,4-dimethylvaleronitrile
LOP = Lauroyl peroxide
IPP = Diisopropylperoxy dicarbonate
KPS = Potassium persulfate
HPMC = Hydroxypropylmethyl cellulose
SML = Sorbitan monolaurate
PVA = Partially saponified polyvinyl alcohol
Na-LS = Sodium laurylsulfate

EXAMPLE 22

The inner walls and other surfaces of a combined installation of a 2-liter capacity vertical type stainless steel polymerization reactor and a 4-liter capacity horizontal type stainless steel polymerization reactor coming into contact with the monomer were coated with a coating liquid in a concentration of 1% by weight as indicated in Table 22 in a coating amount of 0.1 g/m$^2$ as dried, followed by drying with heat, washing with water and final drying.

Into the thus treated polymerization reactor of the vertical type were introduced 800 g of vinyl chloride monomer and 0.3 g of diisopropylperoxy dicarbonate and the polymerization reaction was carried out at a temperature of 60° C. for 2 hours with the stirrer driven at a speed of 900 r.p.m. Then the polymerization mixture was transferred into the horizontal type polymerization reactor charged in advance with 800 g of vinyl chloride monomer and 0.4 g of diisopropylperoxy dicarbonate and the polymerization reaction was continued at a temperature of 57° C. for additional 10 hours with the stirrer driven at a speed of 100 r.p.m. After completion of the polymerization reaction, the amounts of the polymer scale deposited on the inner walls of both of the polymerization reactors were determined to give the results in g/m$^2$ as set out in the table.

Table 22

| Exp. No. | Coating liquid, the same as in: | Drying with heat | Scale formed (g/m$^2$) within: 2-liter Reactor | 4-liter Reactor |
|---|---|---|---|---|
| 232* | None | — | 900 | 800 |
| 233* | Exp. No. 4 | 90° C., 10 min. | 700 | 700 |
| 234 | Exp. No. 204 | 70° C., 60 min. | 2 | 0 |
| 235 | Exp. No. 215 | 90° C., 10 min. | 1 | 0 |
| 236 | Exp. No. 221 | 90° C., 5 min. | 2 | 1 |

EXAMPLE 23

The inner walls of a 100 liter capacity glass-lined polymerization reactor and the surface of the stirrer were coated with a coating liquid in a concentration of 1% by weight as indicated in Table 23 in a coating amount of 0.1 g/m$^2$ as dried, followed by drying with heat and thorough washing with water.

Into the thus treated polymerization reactor were introduced 20 kg of vinyl chloride monomer, 40 kg of deionized water, 13 g of potassium persulfate and 250 g of sodium laurylsulfate, and the polymerization reaction was carried out at a temperature of 50° C. for 12 hours with agitation. After completion of the polymerization reaction, the amount of the polymer scale deposited on the reactor walls was determined to give the results in g/m$^2$ as set out in the table.

Table 23

| Exp. No. | Coating liquid, the same as in: | Drying with heat | Scale (g/m$^2$) |
|---|---|---|---|
| 237* | None | — | 700 |
| 238* | Exp. No. 4 | 90° C., 10 min. | 400 |
| 239 | Exp. No. 206 | " | 0 |
| 240 | Exp. No. 210 | " | 0 |
| 241 | Exp. No. 221 | " | 0 |

EXAMPLE 24

The inner walls of a 100 liter capacity stainless steel polymerization reactor and other parts coming into contact with the monomer were heated in advance and the thus heated surface were coated with a coating liquid in a concentration of 1% by weight as indicated in Table 24 in a coating amount of 0.1 g/m$^2$ as dried, followed by direct washing with water. The polymerization reaction of vinyl chloride was carried out under substantially the same conditions as in Example 20. After completion of the polymerization reaction, the amount of the polymer scale deposited on the reactor walls was determined to give the results in g/m$^2$ as set out in the table.

Table 24

| Exp. No. | Coating liquid, the same as in: | Temperature to which the wall and stirrer were heated | Scale (g/m$^2$) |
|---|---|---|---|
| 242* | None | — | 1,500 |
| 243* | Exp. No. 4 | 90° C. | 1,000 |
| 244 | Exp. No. 204 | 80° C. | 0 |
| 245 | Exp. No. 216 | 50° C. | 2 |
| 246 | Exp. No. 210 | 40° C. | 5 |
| 247 | Exp. No. 221 | 90° C. | 0 |

EXAMPLE 25

The inner walls of a 400 liter capacity stainless polymerization reactor and the surface of the stirrer coming into contact with the monomer were coated with a coating liquid in a concentration of 1% by weight as indicated in Table 25 in a coating amount of 0.1 g/m² as dried, followed by drying with heat and washing with water.

Into the thus treated polymerization reactor were introduced 200 kg of deionized water, 100 kg of styrene monomer, 1 kg of calcium phosphate, 10 g of sodium dodecylbenzene sulfonate and 100 g of benzoyl peroxide, and the polymerization reaction was carried out at a temperature of 90° C. for 11 hours with agitation. After completion of the polymerization reaction, the amount of the polymer scale deposited on the reactor walls was determined to give the results in g/m² as set out in the table.

Table 25

| Exp. No. | Coating liquid the same as in: | Drying with heat | Scale (g/m²) |
|---|---|---|---|
| 248* | None | — | 280 |
| 249* | Exp. No. 10 | 90° C., 10 min. | 200 |
| 250 | Exp. No. 204 | " | 0 |
| 251 | Exp. No. 205 | "0 | |
| 252 | Exp. No. 208 | 80° C., 30 min. | 0 |
| 253 | Exp. No. 215 | 90° C., 10 min. | 0 |
| 254 | Exp. No. 210 | " | 0 |
| 255 | Exp. No. 221 | " | 0 |

EXAMPLE 26

The inner walls of the same polymerization reactor as used in Example 25 and the surface of the stirrer coming into contact with the monomer were coated with a coating liquid in a concentration of 1% by weight as indicated in Table 26 in a coating amount of 0.1 g/m² as dried, followed by drying with heat and washing with water.

The polymerization reaction was carried out in the thus treated polymerization reactor under substantially the same conditions as in Example 25. After completion of the polymerization reaction, the polymerization mixture was discharged out of the reactor which was subsequently washed with water and the polymerization runs were repeated to record the number of the polymerization runs performed without polymer scale deposition exceeding 1 g/m². The results are set out in the table.

Table 26

| Exp. No. | Coating liquid, the same as in: | Drying with heat | No. of polymerization runs |
|---|---|---|---|
| 256* | None | — | 0 |
| 257* | Exp. No. 4 | 90° C., 10 min. | 0 |
| 258 | Exp. No. 204 | " | 16 |
| 259 | Exp. No. 216 | " | 34 |
| 260 | Exp. No. 221 | " | 40 |

EXAMPLE 27

The inner walls of a 400 liter capacity stainless steel polymerization reactor and the surface of the stirrer coming into contact with the monomer were coated with a coating liquid in a concentration of 1% by weight as indicated in Table 27 in a coating amount of 0.1 g/m² as dried, followed by drying with heat and thorough washing with water.

Into the thus treated polymerization reactor were introduced 180 kg of deionized water, 75 kg of 1,3-butadiene monomer, 25 kg of styrene monomer, 4.5 kg of sodium laurylsulfate, 280 g of tert-dodecylmercaptan and 300 g of potassium persulfate, and the polymerization reaction was carried out at a temperature of 50° C. for 12 hours with agitation. After completion of the polymerization reaction, the amount of the polymer scale deposited on the reactor walls was determined to give the results in g/m² as set out in the table.

Table 27

| Exp. No. | Coating liquid, the same as in: | Drying with heat | Scale (g/m²) |
|---|---|---|---|
| 261* | None | — | 430 |
| 262* | Exp. No. 4 | 90° C., 10 min. | 300 |
| 263 | Exp. No. 205 | " | 0 |
| 264 | Exp. No. 215 | " | 0 |
| 265 | Exp. No. 221 | " | 0 |

EXAMPLE 28

The inner walls of a 400 liter capacity stainless steel polymerization reactor and the surface of the stirrer were coated with a coating liquid in a concentration of 1% by weight as indicated in Table 28 in a coating amount of 0.1 g/m² as dried, followed by drying with heat and washing with water. Into the thus treated polymerization reactor were introduced 180 kg of deionized water, 74 kg of 1,3-butadiene monomer, 26 kg of acrylonitrile monomer, 4 kg of sodium oleate, 1 kg of oleic acid, 500 g of tert-dodecylmercaptan, 100 g of sodium pyrophosphate and 300 g of potassium persulfate and the polymerization reaction was carried out at a temperature of 40° C. for 12 hours with agitation. After completion of the polymerization reaction, the amount of the polymer scale deposited on the reactor walls was determined to give the results in g/m² set out in the table.

Table 28

| Exp. No. | Coating liquid, the same as in: | Drying with heat | Scale (g/m²) |
|---|---|---|---|
| 226* | None | — | 330 |
| 267* | Exp. No. 4 | 90° C., 10 min. | 280 |
| 268 | Exp. No. 205 | " | 0 |
| 269 | Exp. No. 221 | " | 0 |

EXAMPLE 29

The inner walls of a 400 liter capacity glass-lined polymerization reactor and the surface of the stirrer were coated with a coating liquid in a concentration of 1% by weight as indicated in Table 29 below in a coating amount of 0.1 g/m² as dried, followed by drying with heat and washing with water. Into the thus treated polymerization reactor were introduced 180 kg of deionized water, 40 kg of 1,3-butadiene monomer, 54 kg of methyl methacrylate monomer, 4 kg of styrene monomer, 4.5 kg of sodium laurylbenzene sulfonate, 280 g of tert-dodecylmercaptan and 300 g of potassium persulfate, and the polymerization reaction was carried out at a temperature of 50° C. for 10 hours with agitation. After completion of the polymerization reaction, the polymerization mixture was discharged out of the reactor which was subsequently washed with water and the amount of the polymer scale deposited on the reactor walls was determinded to give the results in g/m² as set out in the table.

Table 29

| Exp. No. | Coating liquid, the same as in: | Drying with heat | Scale (g/m²) |
| --- | --- | --- | --- |
| 270* | None | — | 130 |
| 271* | Exp. No. 4 | 90° C., 10 min. | 100 |
| 272 | Exp. No. 205 | " | 0 |
| 273 | Exp. No. 221 | " | 0 |

EXAMPLE 30

The inner walls of a 200 liter capacity stainless steel polymerization reactor and the surface of the stirrer were coated with a coating liquid in a concentration of 1% by weight as indicated in Table 30 in a coating amount of 0.1 g/m² as dried, followed by drying heat and washing with water. Into the thus treated polymerization reactor were introduced 30 kg of polybutadiene latex with a solid content of 50%, 50 kg of styrene monomer, 20 kg of acrylonitrile monomer, 100 g of tert-dodecylmercaptan, 500 g of potassium oleate and 500 g of potassium persulfate and the polymerization reaction was carried out at a temperature of 50° C. for 15 hours with agitation to obtain a polymer emulsion of an ABS resin. After completion of the polymerization reaction, the amount of the polymer scale deposited on the reactor walls was determined to give the results in g/m² as set out in the table.

EXAMPLE 31

Aqueous coating liquids were prepared each by dissolving an anionic dye (Compound (a) by C.I. designation) and a metal salt (Compound (c)) in a total concentration of 1% by weight with varied proportions, followed by adjustment of their pH values by aid of hydrochloric acid and addition of various alcohols, the proportions and the alcohols being set forth in Table 31. The amount of the alcohol added was 10 parts by weight based on 100 parts by weight of the aqueous solution of Compounds (a) and (c).

The inner walls of a 100 liter capacity stainless steel polymerization reactor and the surface of the stirrer coming into contact with the monomer were coated with the coating liquid thus prepared in a coating amount of 0.1 g/m² as dried, followed by drying with heat and washing with water.

Into the thus treated polymerization reactor were introduced 26 kg of vinyl chloride monomer, 52 kg of deionized water, 26 g of partially saponified polyvinyl alcohol and 8 g of $\alpha,\alpha'$-azobis-2,4-dimethylvaleronitrile and the polymerization reaction was carried out at a temperature of 57° C. for 8 hours with agitation. After completion of the polymerization reaction, the amount of the polymer scale deposited on the reactor walls was determined to give the results as set out in the table.

Table 31

| Exp. No. | Compound (a) | Compound (c) | Weight ratio (a)/(c) | pH Value | Alcohol added | Drying with heat | Scale (g/m²) |
| --- | --- | --- | --- | --- | --- | --- | --- |
| 279* | None | None | — | — | No | — | 1,500 |
| 280* | Acid Black 2 | None | 100/0 | 10.8 | No | 90° C., 10 min. | 1,000 |
| 281 | Acid Black 2 | Sodium silicate | 100/100 | 3.0 | $A_1$ | 90° C., 10 min. | 0 |
| 282 | Acid Black 2 | Sodium silicate | 100/20 | 6.0 | $A_2$ | 90° C., 10 min. | 1 |
| 283 | Direct Yellow 1 | Sodium silicate | 100/50 | 5.0 | $A_1$ | 70° C., 60 min. | 0 |
| 284 | Mordant Violet 5 | Potassium silicate | 100/50 | 5.0 | $A_1$ | 90° C., 10 min. | 0 |
| 285 | Direct Blue 71 | Sodium silicate | 100/100 | 5.0 | $A_1$ | 90° C., 10 min. | 0 |
| 286 | Mordant Black 5 | Sodium silicate | 25/100 | 3.5 | $A_3$ | 90° C., 5 min. | 2 |
| 287 | Acid Blue 116 | Sodium silicate | 15/100 | 5.0 | $A_3$ | 90° C., 5 min. | 1 |
| 288 | Direct Red 1 | Sodium silicate | 100/20 | 6.0 | $A_4$ | 90° C., 5 min. | 1 |
| 289 | Acid Black 2 | Iron(II) chloride | 100/13 | 5.0 | $A_4$ | 90° C., 10 min. | 0 |
| 290 | Acid Black 2 | Iron(III) chloride | 100/13 | 5.0 | $A_4$ | 90° C., 10 min. | 0 |
| 291 | Acid Black 2 | Zinc acetate | 100/13 | 6.0 | $A_4$ | 90° C., 10 min. | 1 |

Note:
In the column "Alcohol added":
$A_1$ = iso-Butyl alcohol
$A_2$ = sec-Butyl alcohol
$A_3$ = sec-Amyl alcohol
$A_4$ = tert-Amyl alcohol Table 30

| Exp. No. | Coating liquid, the same as in: | Drying with heat | Scale (g/m²) |
| --- | --- | --- | --- |
| 274* | None | — | 180 |
| 275* | Exp. No. 4 | 90° C., 10 min. | 180 |
| 276* | Exp. No. 212 | " | 130 |
| 277 | Exp. No. 205 | " | 0 |
| 278 | Exp. No. 221 | " | 0 |

EXAMPLE 32

The inner walls of a 50 liter capacity stainless steel polymerization reactor and the surface of the stirrer coming into contact with the monomer were coated with a coating liquid in a concentration of 1% by weight as indicated in Table 32 below in a coating amount of 0.1 g/m² as dried, followed by drying with heat and washing with water. Into the thus treated polymerization reactor were introduced 20 kg of deionized water, 10 kg of styrene monomer, 100 g of calcium phosphate, 10 g of sodium dodecylbenzene sulfonate and 10 g of benzoyl peroxide, and the polymerization reaction was carried out at a temperature of 90° C. for 11 hours with agitation.

After completion of the polymerization reaction, the polymerization mixture was discharged out of the reactor which was subsequently washed with water and the polymerization runs were repeated under the same conditions as above to record the number of the polymerization runs performed without the deposition of polymer scale exceeding 1 g/m². The results are set out in the table.

Table 32

| Exp. No. | Coating liquid, the same as in: | Drying with heat | No. of polymerization runs |
|---|---|---|---|
| 292* | None | — | 0 |
| 293* | Exp. No. 4 | 90° C., 10 min. | 0 |
| 294 | Exp. No. 282 | 90° C., 10 min. | 15 |
| 295 | Exp. No. 281 | 90° C., 10 min. | 40 |
| 296 | Exp. No. 285 | 90° C., 10 min. | 34 |
| 297 | Exp. No. 289 | 90° C., 10 min. | 44 |

What is claimed is:

1. In a method for the polymerization of a vinyl monomer or a mixture of vinyl monomers, said polymerization being conducted in a polymerization reactor having a surface in contact with said monomer or mixture of monomers, the improvement which comprises the steps of (i) coating said surface, prior to the polymerization, with an aqueous coating liquid obtained by acidifying an alkaline aqueous solution containing a solution for a colloidal dispersion of at least one member selected from the group consisting of alkali metal salts and ammonium salts of water-soluble anionic dyes of the sulfonic acid form or carboxylic acid form to have a pH value not exceeding 7 by use of a pH adjusting agent, and (ii) drying the thus coated surface.

2. The method as claimed in claim 1 wherein the aqueous coating liquid contains additionally a monovalent alcohol having 3 to 5 carbon atoms in a molecule in an amount from 1 to 20% by weight based on said coating liquid.

3. The method as claimed in claim 1 wherein the concentration of the alkali metal salt or ammonium salt of the water-soluble anionic dye in the aqueous coating liquid is in the range from 0.01 to 5% by weight.

4. The method as claimed in claim 1 wherein the pH value of the aqueous coating liquid is 5 or below.

5. The method as claimed in claim 1 wherein the step of drying is performed with heat at a temperature from 40° to 100° C.

6. The method as claimed in claim 1 wherein the amount of the coating on the surface is not less than 0.001 g/m² as dried.

7. The method as claimed in claim 1 wherein the pH adjusting agent is selected from the group consisting of sulfuric acid, phosphoric acid, nitric acid, molybdic acid, lactic acid, glycolic acid, thioglycolic acid, phytic acid, and acidic salts thereof.

8. In a method for the polymerization of a vinyl monomer or a mixture of vinyl monomers, said polymerization being conducted in a polymerization reactor having a surface in contact with said monomer or mixture of monomers, the improvement which comprises the steps of (i) coating said surface, prior to the polymerization, with an aqueous coating liquid containing at least one compound (a) selected from the group consisting of alkali metal salts and ammonium salts of water-soluble anionic dyes of the sulfonic acid form or carboxylic acid form and at least one compound (b) selected from the group consisting of water-soluble cationic dyes having at least one pair of conjugated double bonds and at least one nitrogen atom in a molecule and having a pH value adjusted by use of a pH adjusting agent not to exceed 7 and (ii) drying the thus coated surface.

9. The method as claimed in claim 8 wherein the aqueous coating liquid contains additionally a monovalent alcohol having 3 to 5 carbon atoms in a molecule in an amount from 1 to 20% by weight based on said coating liquid.

10. The method as claimed in claim 8 wherein the concentration of the alkali metal salt or ammonium salt of the water-soluble anionic dye in the aqueous coating liquid is in the range from 0.01 to 5% by weight.

11. The method as claimed in claim 8 wherein the pH value of the aqueous coating liquid is 5 or below.

12. The method as claimed in claim 8 wherein the step of drying is performed with heat at a temperature from 40° to 100° C.

13. The method as claimed in claim 8 wherein the amount of the coating on the surface is not less than 0.001 g/m² as dried.

14. The method as claimed in claim 8 wherein the ratio of compound (b) to compound (a) is from 100:0.1 to 100:1,000 by weight.

15. The method as claimed in claim 8 wherein the pH adjusting agent is selected from the group consisting of phytic acid and acidic salts thereof.

16. In a method for the polymerization of a vinyl monomer or a mixture of vinyl monomers, said polymerization being conducted in a polymerization reactor having a surface in contact with said monomer or mixture of monomers, the improvement which comprises the steps of (i) coating said surface, prior to the polymerization, with an aqueous coating liquid containing at least one compound (a) selected from the group consisting of alkali metal salts and ammonium salts of water-soluble anionic dyes of the sulfonic acid form or carboxylic acid form and at least one compound (c) selected from the group consisting of silicic acids, silicate compounds and water-soluble salts of metals other than alkali metals and having a pH value adjusted by use of a pH adjusting agent not to exceed 7, and (ii) drying the thus coated surface.

17. The method as claimed in claim 16 wherein the aqueous coating liquid contains additionally a monovalent alcohol having 3 to 5 carbon atoms in a molecule in an amount from 1 to 20% by weight based on said coating liquid.

18. The method as claimed in claim 16 wherein the concentration of the alkali metal salt or ammonium salt of the water-soluble anionic dye in the aqueous coating liquid is in the range from 0.01 to 5% by weight.

19. The method as claimed in claim 16 wherein the pH value of the aqueous coating liquid is 5 or below.

20. The method as claimed in claim 16 wherein the step of drying is performed with heat at a temperature from 40° to 100° C.

21. The method as claimed in claim 16 wherein the amount of the coating on the surface is not less than 0.001 g/m² as dried.

22. The method as claimed in claim 16 wherein the ratio of compound (c) to compound (a) is from 100:0.1 to 100:1,000 by weight.

23. The method as claimed in claim 16 wherein the pH adjusting agent is selected from the group consisting of phytic acid and acidic salts thereof.

* * * * *